United States Patent [19]

Hovorka

[11] Patent Number: 5,321,329
[45] Date of Patent: Jun. 14, 1994

[54] PERMANENT MAGNET SHAFT BEARING

[75] Inventor: Jiri J. Hovorka, Tulsa, Okla.

[73] Assignee: Hovorka Patent Trust, Tulsa, Okla.

[21] Appl. No.: 36,680

[22] Filed: Mar. 25, 1993

[51] Int. Cl.$^5$ .......................... H02K 7/09; F16C 33/02
[52] U.S. Cl. ...................... 310/90.5; 384/277
[58] Field of Search ................... 310/64, 85, 86, 90, 310/90.5, 91; 384/129, 130, 275, 276, 277

[56] References Cited

U.S. PATENT DOCUMENTS

| | | | |
|---|---|---|---|
| 3,016,274 | 1/1962 | Norris | 308/199 |
| 3,614,181 | 10/1971 | Meeks | 310/90.5 |
| 3,746,407 | 7/1973 | Stiles et al. | 308/36.3 |
| 3,977,739 | 8/1976 | Moskowitz et al. | 308/187 |
| 4,040,681 | 8/1977 | van der Heide | 310/90.5 |
| 4,043,619 | 8/1977 | Teske et al. | 308/187.1 |
| 4,128,280 | 12/1978 | Purtschert | 310/90.5 |
| 4,379,598 | 4/1983 | Goldowsky | 310/90.5 |
| 4,898,446 | 2/1990 | Raj et al. | 384/446 |
| 4,984,909 | 1/1991 | Shirotori | 384/493 |
| 5,161,900 | 11/1992 | Bougathou et al. | 384/133 |

OTHER PUBLICATIONS

M. Dussaux Jun. 1990, Status of the Industrial Applications of the Active Magnetic Bearings Technology. The American Society of Mechanical Engineers, 90-G-T-268; presented at the Gas Turbine Congress and Exposition, Brussels, Belgium.

*Primary Examiner*—Steven L. Stephan
*Assistant Examiner*—Matthew Nguyen
*Attorney, Agent, or Firm*—Catalano, Zingerman & McKay

[57] ABSTRACT

A permanent magnet shaft bearing includes a shaft bearing bushing and a flange bearing bushing which are magnetized to saturation. The outer surface of the shaft bearing bushing is magnetized to have the same polarity as the inner surface of the flange bearing bushing so that both bearing surfaces repel one another. Such repulsion creates a space between the bearing surfaces so that no physical contact is present. Both the flange bearing bushing and the shaft bearing bushing are tapered to mate each other. The shaft load requirements determine the magnetic flux density, the mass of the bearing bushings, the composition of the bearing bushings, and the proper angle of the taper. An insulating sleeve protects the bearing bushings from heat transfer in order to help retain permanent magnetization. A magnetically impermeable shield protects the bearing bushings from attracting metal particles.

8 Claims, 2 Drawing Sheets

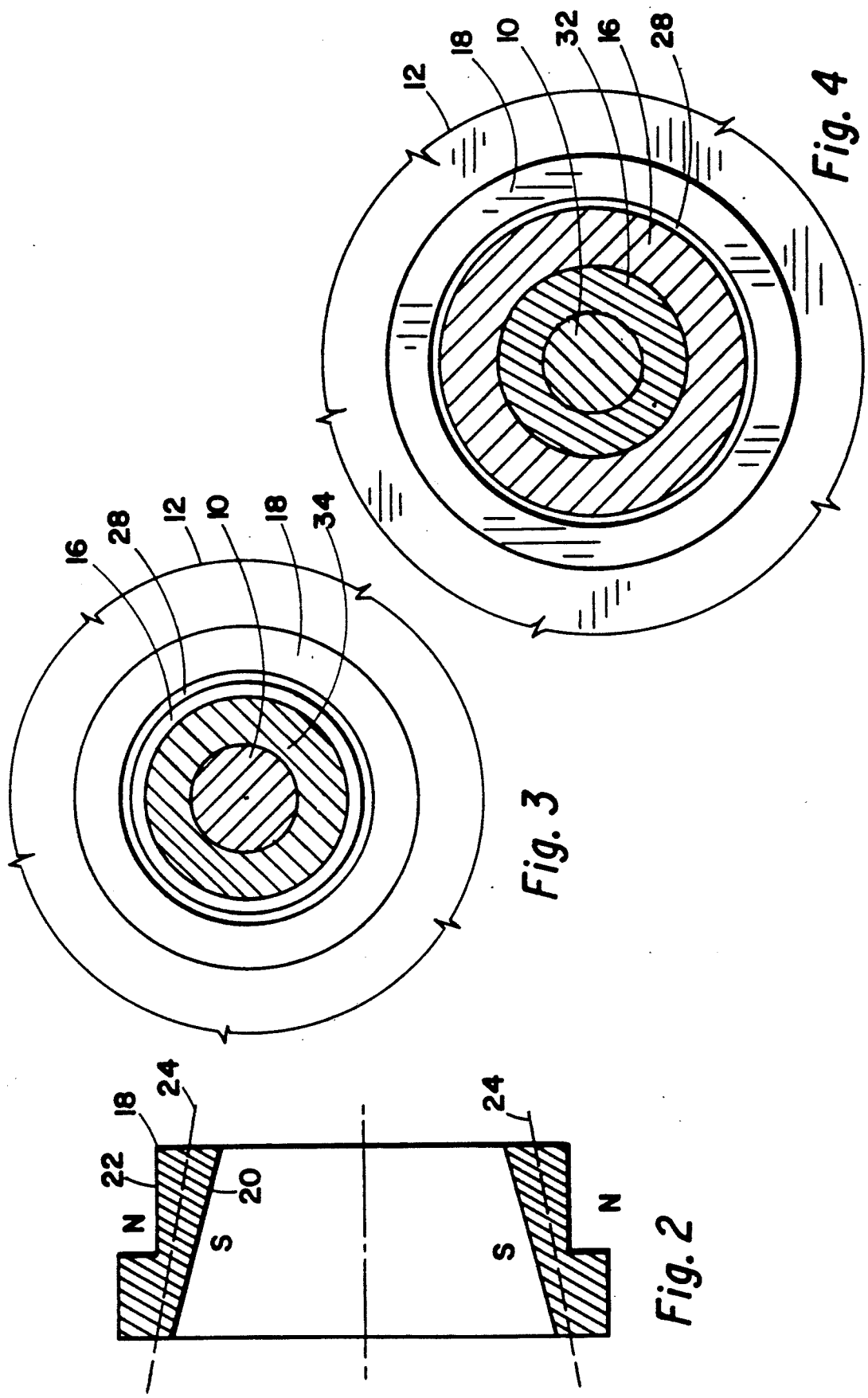

PERMANENT MAGNET SHAFT BEARING

BACKGROUND OF THE INVENTION

1. FIELD OF THE INVENTION

The present invention relates to low friction bearing assemblies; particularly those containing magnetized components.

2. DESCRIPTION OF THE RELATED ART

Bearing assemblies are employed in many different applications where sliding or rotating movement between parts is necessary. In such bearing assemblies it is desireable to have minimal friction between the sliding or rotating parts.

Designs of conventional bearing assemblies vary depending upon the load under which they are subject. Annular ball bearings or cylindrical roller bearings are most common for axial and radial loads. Problems with these bearings are that the ball or roller bearings rotate within metal retaining rings causing friction and eventual wear. The best ball bearings are good only for some thousands of hours of use.

Noncontact bearings, where there is no metal-to-metal contact except when the bearing is at rest, are an improvement over balls or rollers, however, they are costly and impractical for most mechanical applications. Noncontact bearing members rotate on a cushion of gas or fluid except when at rest. These bearings are presently reserved for precision gyro and missile guidance systems.

Magnetization has been attempted in ball bearing applications to provide uniform spacing between the balls. Ferrolubricants, lubricants that are held in place by magnetization, have also been attempted to reduce friction and thermal problems associated with metal-to-metal contact. The problem with ferrolubricants is that they are difficult to retain at the friction points and tend to break down or change viscosity when subject to heat.

A need exists, therefore, for a bearing that reduces metal-to-metal contact between sliding or rotating bearing surfaces to reduce wear and extend bearing life. An additional need exists for such a bearing that is cost effective and efficient for most mechanical applications.

SUMMARY OF THE INVENTION

It is the purpose of this invention to obtain a shaft bearing where there is no metal-to-metal contact between moving parts in order to reduce wear.

An additional purpose is to provide a permanent magnet shaft bearing which is cost efficient due to the minimal number of component parts, yet is capable of meeting a wide range of load requirements.

An apparatus to accomplish these purposes is comprised of a shaft bearing bushing and a flange bearing bushing which are magnetized to saturation to obtain the maximum Gauss per unit. The size, flux density and chemical composition of the shaft bearing bushing and flange bearing bushing are determined by the radial and axial load requirements on the shaft.

The outer surface of the shaft bearing bushing has the same internal surface area as the inner surface of the flange bearing bushing. The bearing bushings are magnetized such that the outer surface of the shaft bearing bushing has the same polarity as the inner surface of the flange bearing bushing. Since electro-magnetic radiation energy is equal in division (north - south) or (positive - negative), the bearing bushings can be magnetized so that the magnetic equator will be in the center axially in both the shaft bearing bushing and the flange bearing bushing. Once magnetized, the outer surface of the shaft bearing bushing will repel the inner surface of the flange bearing bushing. This repulsion creates a space between the bearing surfaces so that no physical contact is present.

The flange bearing bushing contains an annular taper on its inner surface. The shaft bearing bushing contains an annular taper on its outer surface mating of the flange bearing bushing. The angle of this taper will vary between 15° and 45° depending on the load requirements of the shaft.

An insulating sleeve is inserted between the shaft bearing bushing and the shaft to protect the bearing bushings from heat transfer in order to help retain permanent magnetization of the bearing bushings. A magnetically impermeable shield is press fit on the shaft on each end of the bearing in order to protect the bearing bushings from attracting metal particles which would cause the bearing to wear. The insulating sleeve combined with the magnetically impermeable shield enshroud the bearing to protect it from damage and wear.

Other features and advantages of the invention will become apparent in view of the drawings and following detailed description.

BRIEF DESCRIPTION OF THE DRAWINGS

FIG. 2 is a cross-sectional view of an flange bearing bushing of this invention depicting the magnetic equator and its polarity.

FIG. 3 is a view taken along line 3—3 of FIG. 1.

FIG. 4 is a view taken along line 4—4 of FIG. 1.

DETAILED DESCRIPTION OF THE PREFERRED EMBODIMENT

Figure 1:
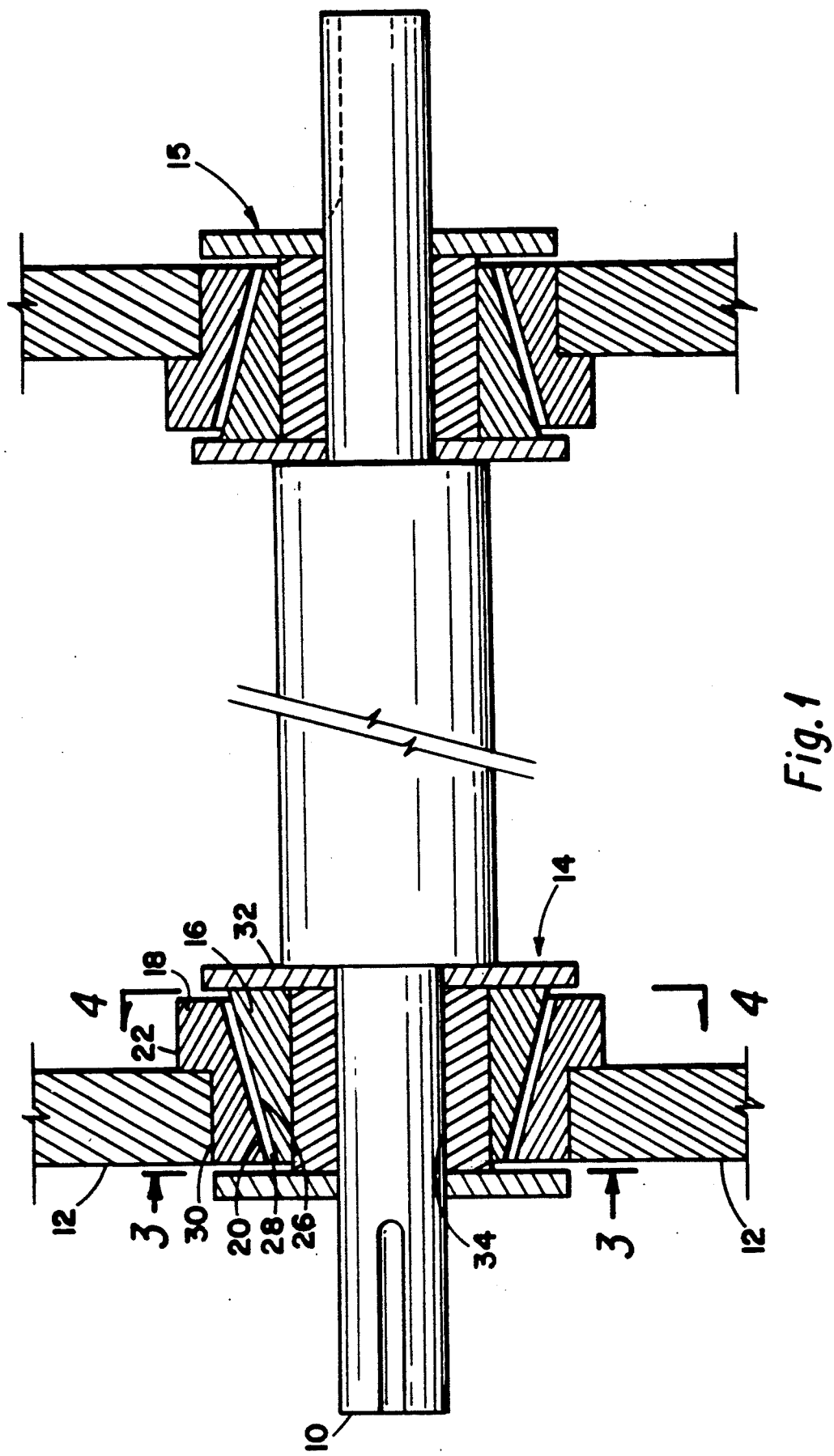
FIG. 1 is a cross-sectional view of a pair of permanent magnet shaft bearings of this invention as mounted on a shaft and in contact with a flange.

FIG. 1 depicts a cross-sectional view of the permanent magnet shaft bearing of this invention. Shaft 10 could be any shaft under an axial and/or radial load requiring a bearing. Flange 12 could be any flange placing a load on shaft Permanent magnet shaft bearing, generally 14, is annular in configuration and press fit onto shaft 10. Permanent magnet shaft bearing 14 is comprised of a shaft bearing bushing 16 and a flange bearing bushing 18. Both shaft bearing bushing 16 and flange bearing bushing 18 are annular. Shaft bearing bushing 16 and flange bearing bushing 18 are magnetized to saturation. Magnetic saturation will depend upon the size of the bearing bushings and their composition. Saturation is the maximum flux density of magnetization for the bushing expressed in Gauss.

Shaft bearing bushing 16 and flange bearing bushing 18 may be composed of any suitable material known in constructing magnets. The preferred construction is neodemium boron iron parametallurgy presently known in the art in the manufacture of rare earth magnets. The bearing bushings are sintered from powdered metal and pressed into form. One alternative is to use Alnico #8, commercially available, which is melted, poured and cast; then machined and ground to the proper dimensions. Once constructed, bearing bushings 16 and 18 are then subject to direct current in order to magnetize to saturation.

FIG. 2 shows a side cross-sectional view of flange bearing bushing 18. Flange bearing bushing 18 has been magnetized such that its inner surface 20 has a south polarity and its outer surface 22 has a north polarity. It is known that electro-magnetic radiation energy is divided equally, either north-south or positive-negative over the entire magnetized body. In a preferred arrangement, bearing bushings 16 and 18 are magnetized axially. The magnet equator of flange bearing bushing 18 will be its annular axis 24. This is true also for shaft bearing bushing 16; its magnetic equator will, likewise, be its annular axis.

Referring to FIG. 1, the outer surface 26 of shaft bearing bushing 16 will have the same polarity as the inner surface 20 of flange bearing bushing 18.

EXAMPLE I

For exemplification purposes, outer surface 26 of shaft bearing bushing 16 would have a south polarity. Likewise, inner surface 20 of flange bearing bushing 18 would also have a south polarity. Therefore, since both bearing bushing surfaces 26 and 20 have the same polarity, bearing surfaces 26 and 20 would repel each other.

Since shaft bearing bushing 16 and flange bearing bushing 18 are magnetized to their saturation point, outer surface 26 of shaft bearing bushing 16 will not contact inner surface 20 of flange bearing bushing 18 as long as the mass of the shaft bearing bushing 16 and flange bearing bushing 18 are substantial enough to sustain the load placed upon them. For increased axial and radial loads, shaft bearing bushing 16 and flange bearing bushing 18 would have larger masses. A space, or air gap, 28 will remain between shaft bearing bushing 16 and flange bearing bushing 18. Space 28 prevents metal from contacting metal as the bearing is in operation. The size of space, or air gap, 28 will depend upon the axial load placed upon the bearing and vary between 0.005 in. and 0.010 in. Higher axial loads will increase the repulsion between bearing bushings 16 and 18 or higher flux density concentrated per square inch.

In FIG. 1, the inner surface 20 of flange bearing bushing 18 is tapered. The outer surface 26 of shaft bearing bushing 16 is also tapered to mate the taper of flange bearing bushing 18. The taper of shaft bearing bushing 16 and flange bearing bushing be keeps bearing 14 in alignment. If the surfaces 20 and 26 were not tapered, the magnetic repulsion would cause either shaft bearing bushing 16 or flange bearing bushing be to be thrown out of bearing 14. The taper equalizes the repulsive forces of bearing bushings 16 and 18 so they will remain in alignment.

The taper on both shaft bearing bushing 16 and flange bearing bushing 18 will vary between 15° and 45° depending upon the axial load on the shaft. An increase in the axial load upon the shaft will require an increase in the angle of the taper.

To construct an efficient bearing, the radial and axial load requirements must be known in order to design the physical structure of the bearing. The mass of the shaft bearing bushing 16 and the flange bearing bushing 18, the flux density in Gauss, and the variations in the taper from 15° to 45° are selected in order for the correct function of the bearing to result.

The outer surface 22 of flange bearing bushing 18 contains a shoulder portion 30 to receive flange 12. It is understood that various configurations of the outer surface 22 of flange bearing bushing 18 could be constructed depending upon the application.

A two-piece annular magnetically impermeable shield 32 of is press-fit onto bearing 14. Shield 32 extends from shaft 10 past thermal insulating sleeve 34, shaft bearing bushing 16 and flange bearing bushing 18. Thermal insulating sleeve 34 protects the magnetized bearing bushings 16 and 18 from heat transfer from the shaft in order to help retain permanent magnetization.

Thermal insulating sleeve 34 is also of annular cross-section to protect bearing bushings 16 and 18. Thermal insulating sleeve 34 is disposed between shaft 10 and shaft bearing bushing 16. Magnetically impermeable shield engages sleeve 34 such that its upright portion extends adjacent to bearing bushings 16 and 18. When assembled, shield 32 and sleeve 34 enshroud bearing bushings 16 and 18 to provide a thermal and magnetic insulating barrier to protect bearing bushing 16 and 18 from heat which would destroy magnetization of bearing bushings 16 and 18 and prevents the attraction of metal particles which would cause wear to bearing bushings 16 and 18.

FIG. 3 is a view taken along line 3—3 of FIG. 1. As can be seen from FIG. 3, the relationship of the elements comprising bearing 14 can be viewed. The existence of the taper causes flange bearing bushing 18 to appear much larger than shaft bearing bushing 16.

FIG. 4 is a view taken along line 4—4 of FIG. 1. From this figure, it can be seen that the taper causes shaft bearing bushing 16 to appear much larger than flange bearing bushing 18. FIGS. 3 and 4 depict the annular configuration of the bearing components.

While the invention has been described with a certain degree of particularity, it is manifest that many changes may be made in the details of construction and the arrangement of components without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

What is claimed is:

1. A permanent magnet shaft bearing, comprising
a magnetized unitary annular shaft bearing bushing including an inner surface, an outer surface, an annular axis, a mass, and a magnetic flux density;
said shaft bearing bushing is magnetized axially to create opposite magnetic poles and a magnetic equator, said magnetic equator equally dividing said mass and magnetic flux density;
a magnetized unitary annular flange bearing bushing including an inner surface, an outer surface, an annular axis, a mass, and a magnetic flux density;
said flange bearing bushing is magnetized axially to create opposite magnetic poles and a magnetic equator, said magnetic equator equally dividing said mass and magnetic flux density;
the inner surface of the flange bearing bushing is positioned adjacent the outer surface of the shaft bearing bushing and the magnetic polarity of the inner surface of the flange bearing bushing is the same as the polarity of the outer surface of the shaft bearing bushing causing magnetic repulsion creating an air gap between the inner surface of the flange bearing bushing and the outer surface of the flange bearing bushing;
mean for protecting said shaft bearing bushing and said flange bearing bushing from heat transfer positioned. adjacent said inner surface of said shaft bearing bushing;

means for protecting said shaft bearing bushing and said flange bearing bushing from attracting and collecting undesirable material positioned adjacent said shaft bearing bushing and said flange bearing bushing.

2. The permanent magnet shaft bearing, as described in claim 1 wherein the means to protect said shaft bearing bushing and said flange bearing bushing from heat transfer includes:

an annular thermal insulating sleeve including an inner surface and an outer surface positioned such that the outer surface of the thermal insulating sleeve is adjacent to the inner surface of the shaft bearing bushing.

3. The permanent magnet shaft bearing, as described in claim 5 wherein the means to protect said shaft bearing bushing and said flange bearing bushing from attracting and collecting undesirable material includes:

an annular magnetically impermeable shield extending from the shaft contacting the thermal insulating sleeve, shaft bearing bushing and flange bearing bushing such that the thermal insulating sleeve and the annular magnetically impermeable shield combine to insulate the permanent magnet shaft bearing against heat and magnetic attraction.

4. The permanent magnet shaft bearing, as described in claim 1, wherein the inner surface of the flange bearing bushing is tapered and the outer surface of the shaft bearing bushing is tapered to mate the taper of the flange bearing bushing.

5. The permanent magnet shaft bearing, as described in claim 4, wherein an axial load is placed on the bearing such that the taper of the inner surface of the flange bearing bushing and mating taper of the shaft bearing bushing vary between 15° and 45° depending upon the axial load placed on the bearing.

6. A permanent magnet shaft bearing, comprising:

a magnetized unitary annular shaft bearing bushing including an inner surface, an outer surface, an annular axis, a mass, and a magnetic flux density;

said shaft bearing bushing is magnetized axially to create opposite magnetic poles and an axial annular magnetic equator located at the annular axis, equally dividing said mass and said magnetic flux density;

a magnetized unitary annular flange bearing bushing including an inner surface, an outer surface, an annular, axis, a mass, and a magnetic flux density;

said flange bearing bushing is magnetized axially to create opposite magnetic poles and an axial annular magnetic equator located at the annular axis, equally dividing said mass and said magnetic flux density;

the inner surface of the flange bearing bushing is tapered and positioned adjacent the outer surface of the shaft bearing bushing which is tapered to mate the taper of the inner surface of the flange bearing bushing;

the inner surface of the flange bearing bushing and the outer surface of the shaft bearing bushing are tapered in order for the bearing to sustain an axial load;

the magnetic polarity of the inner surface of the flange bearing bushing is the same as the magnetic polarity of the outer surface of the shaft bearing bushing causing magnetic repulsion creating an air gap between the inner surface of the flange bearing bushing and the outer surface of the flange bearing bushing;

a cylindrical thermal insulating sleeve including an inner surface and an outer surface positioned such that the outer surface of the thermal insulating sleeve is adjacent to the inner surface of the shaft bearing bushing.

an annular magnetically impermeable shield extending from the shaft contacting the thermal insulating sleeve, shaft bearing bushing and flange bearing bushing such that the thermal insulating sleeve and the annular magnetically impermeable shield combine to insulate the permanent magnet shaft bearing against heat and magnetic attraction.

7. The permanent magnet shaft bearing, as described in claim 6, wherein an axial load is placed on the bearing such that the taper of the inner surface of the flange bearing bushing and mating taper of the shaft bearing bushing vary between 15° and 45° depending upon the axial load placed on the bearing.

8. A permanent magnet shaft bearing system for sustaining radial and axial loads, comprising:

a shaft having a first end and a second end;

a pair of unitary shaft bearing bushings each including an inner surface, a tapered outer surface, an annular axis, a mass, and a magnetic flux density;

each of said shaft bearing bushings is magnetized to saturation in an axial orientation to create opposite magnetic poles and an axial annular magnetic equator located along the annular axis equally dividing said mass and said magnetic flux density;

one of said pair of shaft bearing bushings is positioned on said first end of said shaft and the other of said shaft bearing bushings is positioned on said second end of said shaft;

a pair of unitary flange bearing bushings each including a tapered inner surface, an outer surface, an annular axis, a mass, and a magnetic flux density;

each of said flange bearing bushings is magnetized to saturation in an axial orientation to create opposite magnetic poles and an axial annular magnetic equator located along the annular axis equally dividing said mass and said magnetic flux density;

one of said pair of flange bearing bushings is positioned on said first end of said first and the other of said flange bearing bushings is positioned on said second end of said shaft;

the inner surface of said pair of flange bearing bushings are tapered and positioned adjacent the outer surface of the said pair of shaft bearing bushings which are tapered to mate the taper of the inner surface of said pair of flange bearing bushings;

said taper of said inner surface of said flange bearing bushings and mating taper of said shaft bearing bushings vary between 15° and 45° depending upon the axial load placed on said bearing system;

the magnetic polarity of the inner surface of the flange bearing bushings is the same as the magnetic polarity of the outer surface of the shaft bearing bushings causing magnetic repulsion creating an air gap between the inner surface of the flange bearing bushings and the outer surface of the flange bearing bushings;

the taper and magnetic repulsion of said shaft and flange bearing bushings positioned on said first and second end of said shaft combine to produce a bearing system that is self-aligning and provides stability to the shaft;
a pair of cylindrical thermal insulating sleeves including inner surfaces and outer surfaces positioned such that the outer surfaces of the thermal insulating sleeves are adjacent to the inner surfaces of the shaft bearing bushings
a pair of annular magnetically impermeable shields extending from the shaft contacting said thermal insulating sleeves, a shaft bearing bushings and flange bearing bushings such that the thermal insulating sleeves and the annular magnetically impermeable shields combine to insulate the permanent magnet shaft bearing system against heat and magnetic attraction.

* * * * *